(12) United States Patent
Chiu

(10) Patent No.: US 8,063,972 B2
(45) Date of Patent: Nov. 22, 2011

(54) IMAGE CAPTURE DEVICE AND CONTROL METHOD THEREOF

(75) Inventor: Kuo-Chun Chiu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 334 days.

(21) Appl. No.: 12/512,041

(22) Filed: Jul. 30, 2009

(65) Prior Publication Data

US 2010/0277614 A1    Nov. 4, 2010

(30) Foreign Application Priority Data

Apr. 29, 2009  (CN) .......................... 2009 1 0301933

(51) Int. Cl.
 *H04N 5/222* (2006.01)
 *H04N 5/76* (2006.01)
 *G03B 13/02* (2006.01)
(52) U.S. Cl. ................. 348/333.11; 348/231.1; 396/374
(58) Field of Classification Search ............. 348/333.11, 348/333.12, 333.05, 333.01, 231.3; 396/374
See application file for complete search history.

(56) References Cited

U.S. PATENT DOCUMENTS

| 7,643,080 B2* | 1/2010 | Abe et al. ................. 348/333.03 |
| 7,924,340 B2* | 4/2011 | Kato ........................ 348/333.05 |
| 2005/0088542 A1* | 4/2005 | Stavely et al. ................ 348/239 |
| 2010/0194963 A1* | 8/2010 | Terashima ............... 348/333.11 |
| 2011/0001802 A1* | 1/2011 | Misawa .......................... 348/51 |
| 2011/0199505 A1* | 8/2011 | Teranishi ................... 348/222.1 |

* cited by examiner

*Primary Examiner* — John Villecco
(74) *Attorney, Agent, or Firm* — Altis Law Group, Inc.

(57) ABSTRACT

An image capture device includes an image capture unit, a signal processing circuit a control unit, and a display. The image capture unit captures image information of the object and forms an imaging plane. The signal processing circuit receives analog image signals and converts them to digital image signals. The control unit locates a target sector, frames a square area within the sector, defines a central point of the square area, forms reference points, calculates a distance from the central point to each of the reference points, duplicates the square area to locate the central point at each of the reference points, and calculates an actual movement distance required for the image capturing device to relocate to the reference points according to a relationship of the distance. The display displays a layout of the reference images and the information.

20 Claims, 5 Drawing Sheets

IMAGE CAPTURE DEVICE AND CONTROL METHOD THEREOF

BACKGROUND

1. Technical Field

The present disclosure relates to image capture devices and, particularly, to an image capture device providing multiple image capture previews and a control method thereof.

2. Description of the Related Art

Current image capture devices such as cameras typically can preview only one image at one time. To preview and compare different capture angles to determine which is preferred, images must be captured from each angle, and compared by memory. This is both inconvenient and inaccurate.

Therefore, it is desirable to provide an image capture device and a control method thereof which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present image capture device and the control method thereof. Moreover, in the drawings, like reference numerals designate corresponding parts throughout the views.

DETAILED DESCRIPTION

Embodiments of the image capture device and the control method thereof are described in detail here with reference to the drawings.

Figure 1:
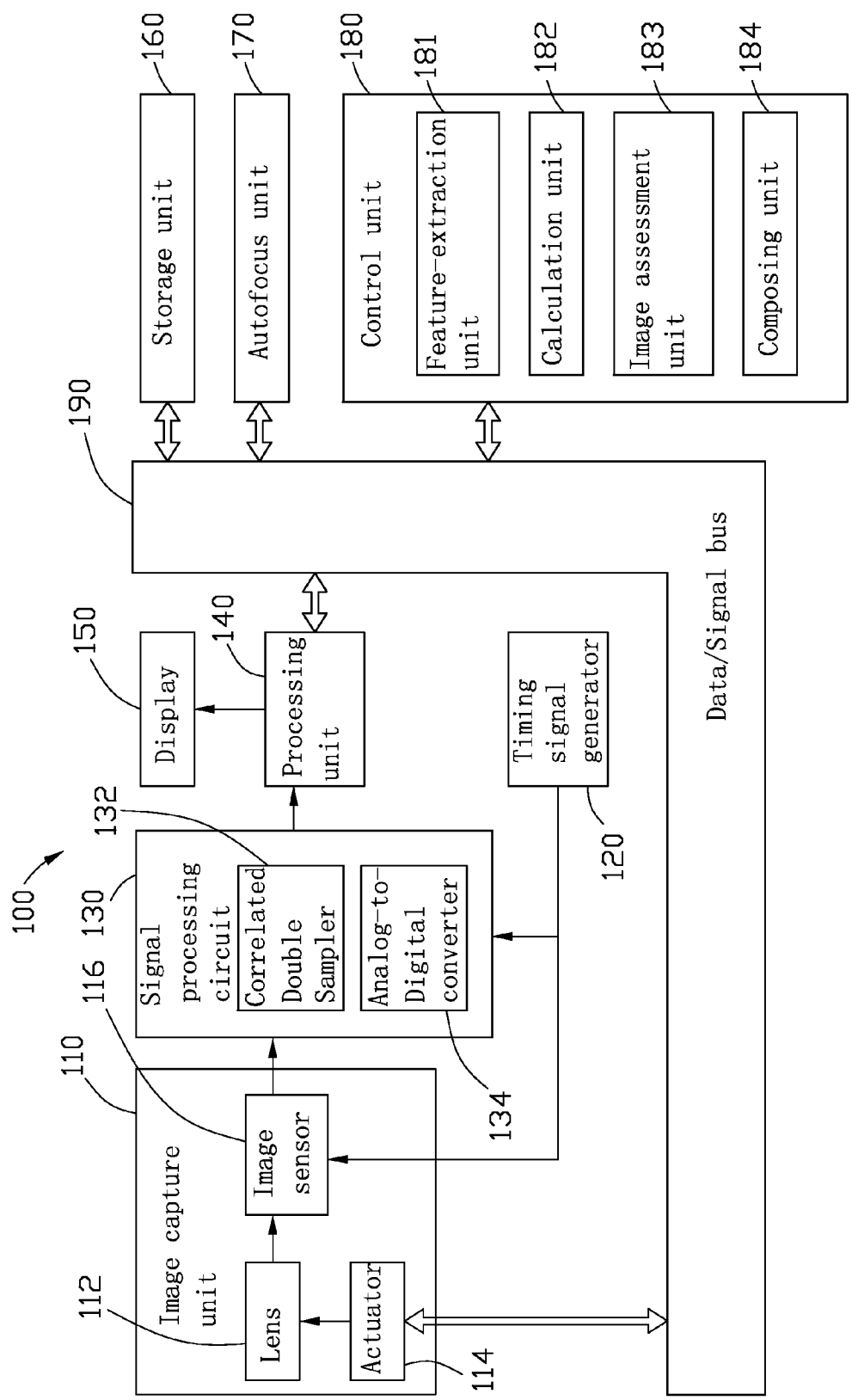
FIG. 1 is a functional block diagram of an image capture device, according to an embodiment.

As shown in FIG. 1, an image capture device 100 includes an image capture unit 110, a timing signal generator 120, a signal processing circuit 130, a processing unit 140, a display 150, a storage unit 160, an autofocus unit 170, a control unit 180, and a number of data/signal buses 190. In this embodiment, the image capture device 100 is a digital still camera, although any other image capture device such as a cellular phone having a camera module is equally applicable while remaining well within the scope of the disclosure.

The image capture unit 110 captures raw image data of an object (analog RGB data). The raw image data is sequentially processed by the signal processing circuit 130 and the processing unit 140, and becomes a digital image which can be stored in the storage unit 160 or displayed on the display 150. The image capture unit 110 may include a Charge Coupled Device (CCD) (one kind of image sensor 116, see below). The control unit 180 processes the digital image to form different reference images (shown in FIG. 4) which can be stored in the storage unit 160 and displayed on the display 150 for previewing (see below). The timing signal generator 120 generates timing signals to coordinate components of the image capture device 100 such as the image capture unit 110, the signal processing circuit 130, and the processing unit 140, in time domain. The data/signal buses 190 connect components of the image capture device 100 such as the image capture unit 110, the signal processing circuit 130, and the processing unit 140 to allow communication therebetween.

The image capture unit 110 includes a lens 112, an actuator 114, and an image sensor 116. The actuator 114 moves the lens 112 to vary a focal length thereof and/or a position of an image plane thereof according to control signals from the autofocus unit 170 so that optical images of the object are focused on the image sensor 116. The image sensor 116 transmits the raw image data corresponding to the optical images of the objects to the signal processing circuit 130 as directed by the timing signals.

The signal processing circuit 130 includes a correlated double sampler (CDS) 132 and an analog-to-digital converter (ADC) 134. The CDS 132 receives the raw image data and removes noise signals therefrom. The ADC 134 converts the raw image data from analog to digital format and transmits the raw digital image data to the processing unit 140.

The processing unit 140 processes the raw digital image data for conversion from raw color format RGB (red, blue, and green), into YUV color format (luminance and chrominance, respectively). The digital images are stored in the storage unit 160 or encoded into video signals and displayed on the display 150.

The autofocus unit 170 analyzes the digital images and signals the actuator 114 to vary the focal length and/or the position of the image plane of the lens 112 accordingly. In detail, the actuator 114 switches the lens 112 among predetermined settings. The autofocus unit 170 compares contrasts of the digital image corresponding to the predetermined settings of the lens 112 to determine the setting corresponding to the highest contrast. Then, it is determined that, at that setting, that image capture unit 110 is focused.

The control unit 180 includes a feature-extraction unit 181, a calculation unit 182, an image assessment unit 183, and a composing unit 184. The feature-extraction unit 181 locates a predetermined sector of the object. For example, referring to FIG. 2, in this embodiment, the object is a person and feature-extraction unit 181 can locate a square area S within the person's face and can identify a center H of the S.

Figure 2:
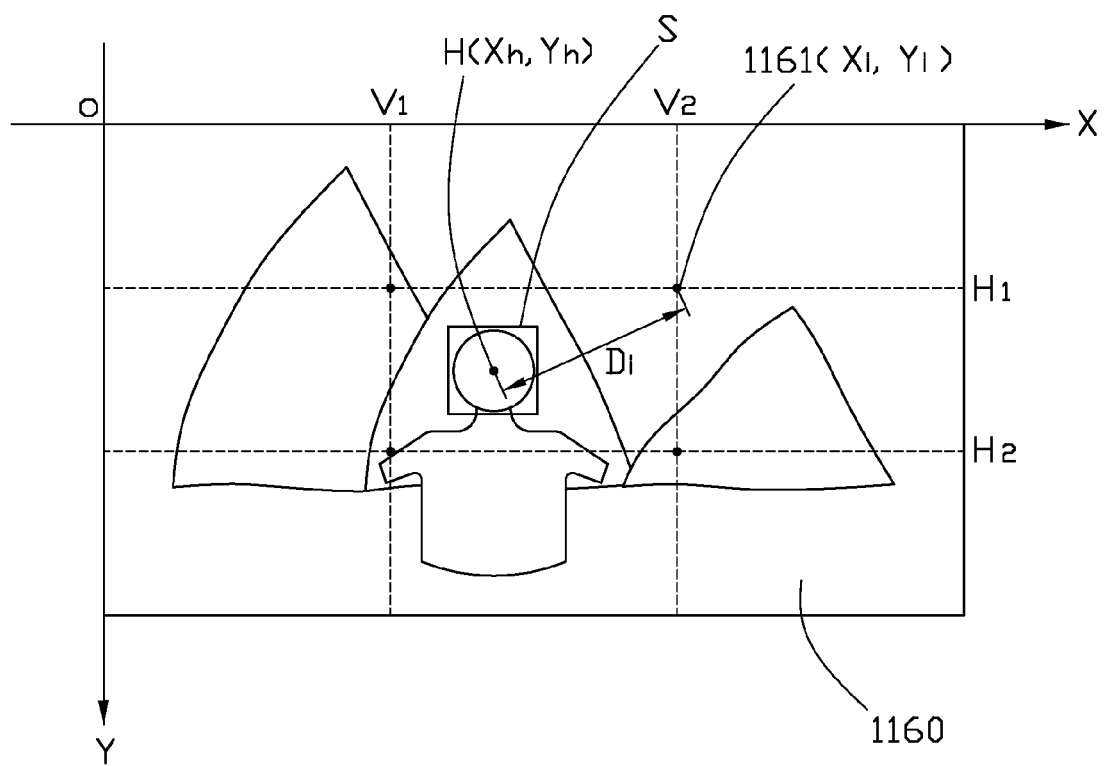
FIG. 2 is a schematic diagram of an image formed on an image sensor of the image capture device of FIG. 1.

Referring to FIG. 2, the feature-extraction unit 181 applies an XY coordinate to the digital image 1160, where the origin O of the XY coordinate is located in an upper-left corner of the digital image. The feature-extraction unit 181 determines the center H $(X_h, Y_h)$ of the sector S based on intersection of two diagonal lines.

The calculation unit 182 forms several reference points 1161 on the imaging plane 1160. The calculation unit 182 separates the imaging plane 1160 into a nine-section grid by two vertical lines $V_1$, $V_2$ along the Y axis and two horizontal lines $H_1$, $H_2$ along the X axis. Intersections of the gridlines form four reference points 1161 $(X_i, Y_i)$, where i=1, 2, 3, 4.

The calculation unit 182 calculates a distance $D_i$ from the center H to the reference points 1161 using the formula:

$$D_i = |(X_h, Y_h) - (X_i, Y_i)|, \text{ where } i=1, 2, 3, 4.$$

Figure 3:
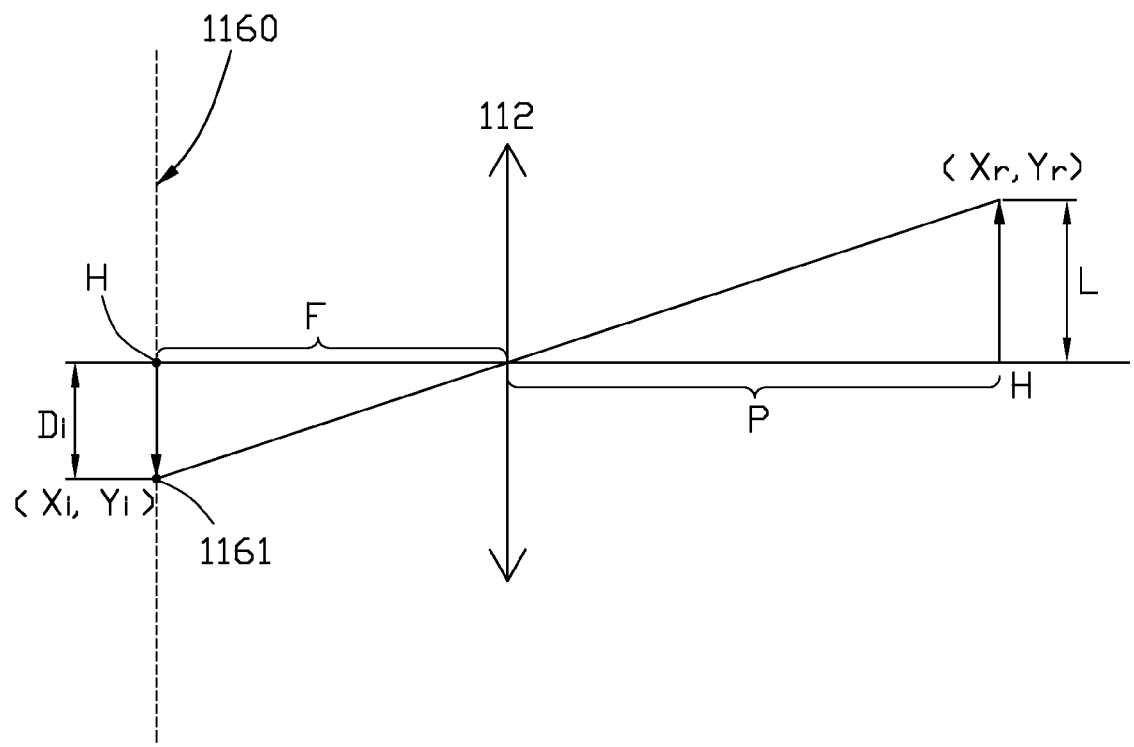
FIG. 3 is a schematic view showing an optical path of the image capture device of FIG. 1.

Referring to FIG. 3, the calculation unit 182 also calculates a current object distance P and a current image distance F based upon information from the autofocus unit 170. Significantly, the image assessment unit 183 calculates distance L required to relocate to achieve refocus of the predetermined portion at the reference point 1161. For example, the distance between the H and the reference point 1161 is $D_i$.

The F is measured from the lens 112 to the $D_i$ and the P is measured from the lens 112 to an actual movement distance L $(X_1, Y_1)$. The L is measured according to a ratio of the $D_i$, F, Relocation of the object resulting in a new distance between the object and the image capture device 100, accomplished by moving L inversely equals relocation of the image capture device 100 resulting in a new distance between the subject and the image capture device 100, accomplished by moving −L (−$X_1$, −$Y_1$). In most situations, relocation of the image capture device 100 is more convenient than relocation of the object. Accordingly, the image assessment unit 183 calculates the −L.

Figure 4:
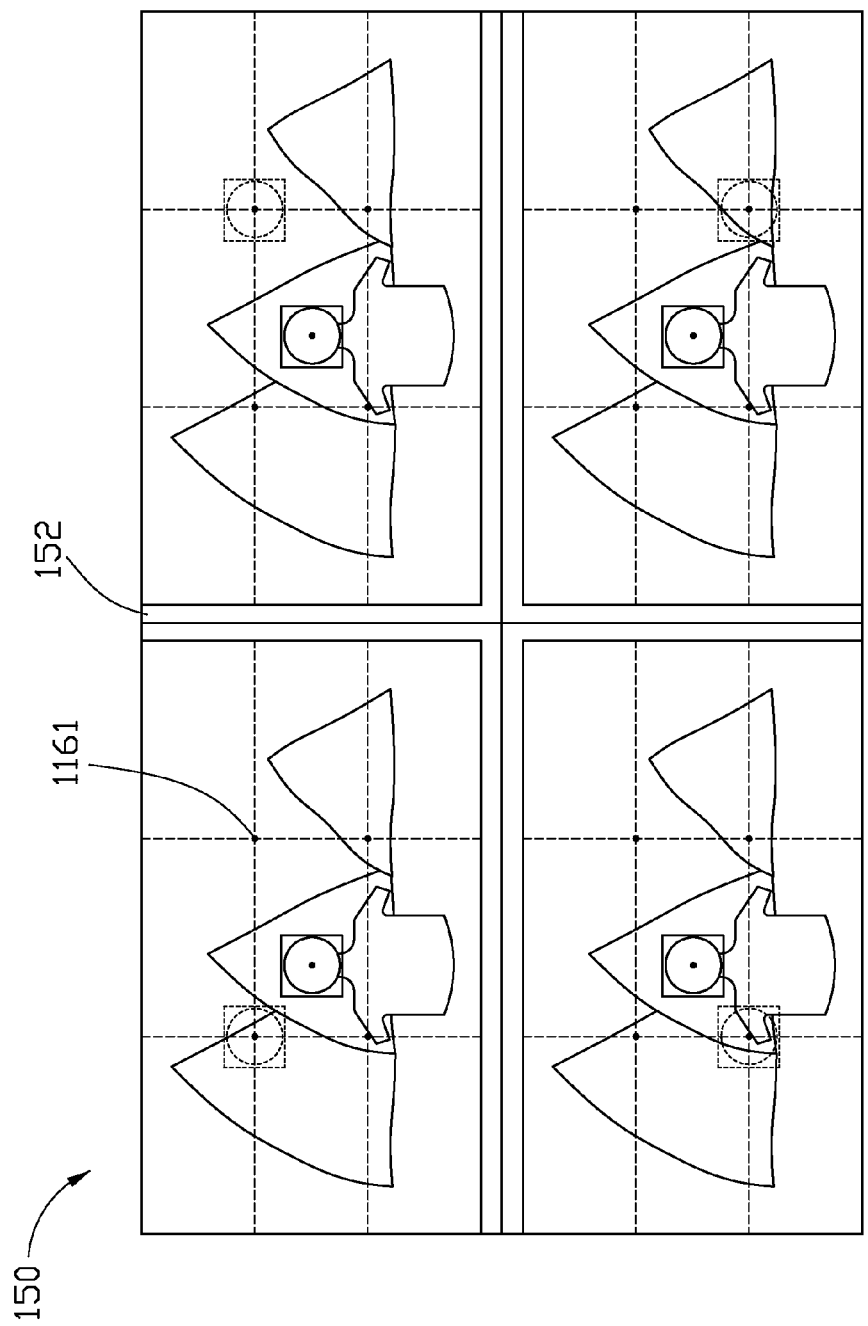
FIG. 4 shows an exemplary preview on a display unit of the image capture device of FIG. 1.

Referring to FIG. 4, the image assessment unit 183 duplicates the S based on the location of each H at reference points 1161 to form four reference images 152 on which each S is in respectively at different position. The reference images 152 are stored in the storage unit 160.

The composing unit 184 frames a predetermined number of reference images 152 in a corresponding layout. In this embodiment, the composing unit 184 includes the layout 2×2, but the composing unit 184 is not limited thereto.

The display 150 displays the corresponding layout of the reference images 152 and information for movement distance L of the image capture device 100 corresponding to each.

Figure 5:
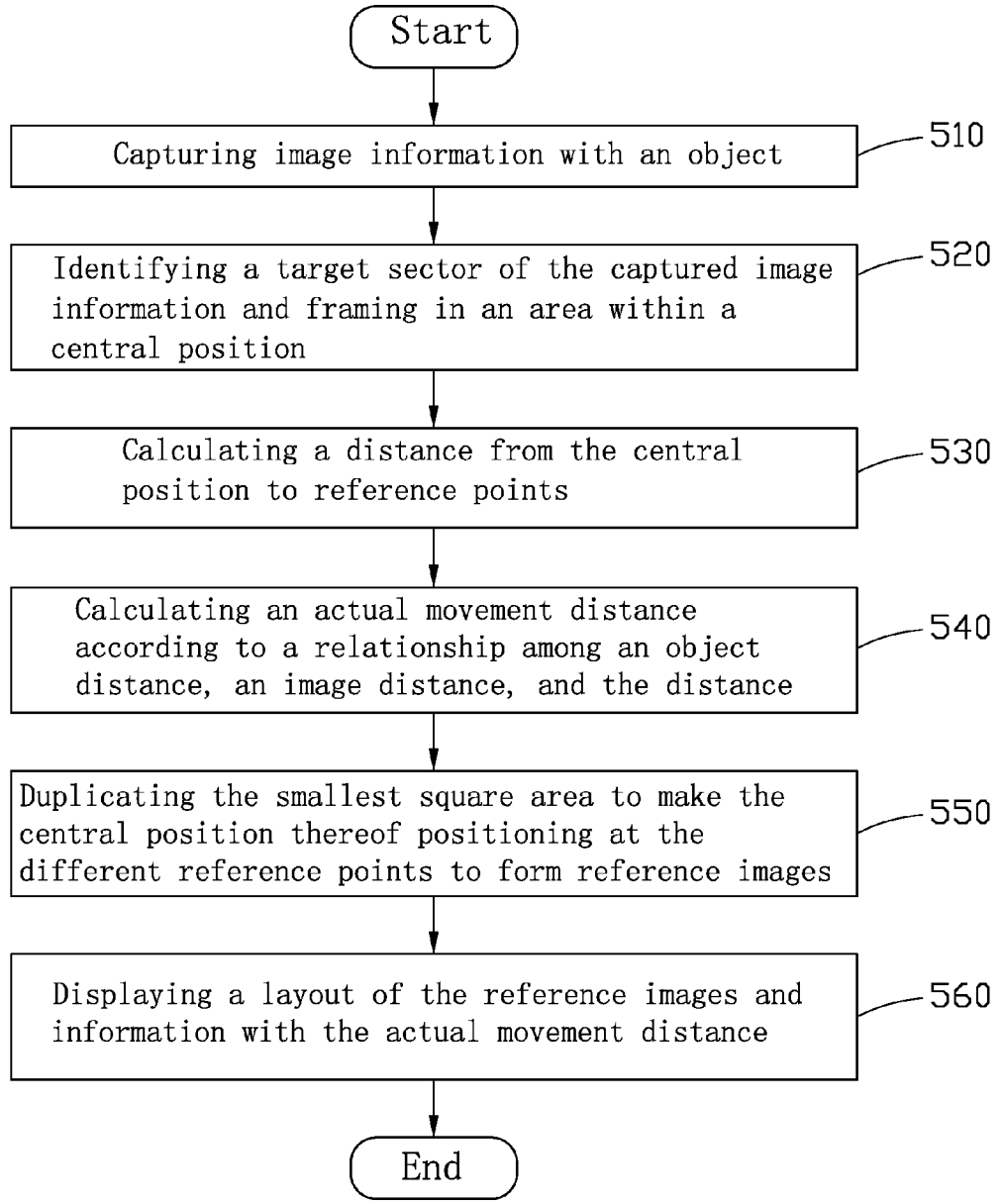
FIG. 5 is a flowchart of a control method for an image capture device, such as, for example, that of FIG. 1.

Referring to FIG. 5, an embodiment of a control method as disclosed may be performed by, for example, the image capture device 100 of FIG. 1.

In step 510, the image information of the subject is captured by the image capture unit 110.

In step 520, a target sector of the captured image information is identified and framed in an area S with a center point H thereof.

In step 530, the distance $D_i$ on the imaging plane 1160 from the H to the reference points 1161 is calculated.

In step 540, the actual movement distance L of the image capture device 100 is calculated according to the relationships among the subject distance P, the image distance F, and $D_i$.

In step 550, the S is duplicated and the H of the S is repositioned at each of the reference points 1161 to form, here as an example, four reference images 152.

In step 560, the layout of the reference images 152 and the information of actual movement distance L of the image capture device 100 for each is correspondingly displayed on the display 150.

It is noted that the disclosed image capture device provides different reference images displayed on the display for previewing, whereby the user can adjust the image capture device's position and enhance captured image quality.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capture device capable of providing multiple previews of an object, comprising:

an image capture unit configured for capturing image information of the object and forming an image on an imaging plane;

a signal processing unit configured for receiving analog image signals and converting the analog image signals to digital image signals;

a control unit configured for locating a target sector of the image of the object, framing a square area within the sector, defining a central point of the square area, forming reference points, calculating a distance from the central point to each of the reference points, duplicating the square area to locate the central point at each of the reference points, and calculating actual movement distance required to relocate to the reference points accordingly;

a storage unit configured for storing the reference images and the information of the actual movement distance; and a display configured for displaying a layout of the reference images and the corresponding information.

2. The image capture device of claim 1, wherein the image capture unit comprises a lens, an image sensor, and an actuator, the actuator being configured for driving the lens along the optical axis of the image capture unit according to control signals, and the image sensor transmitting the analog image signals to the signal processing unit according to predetermined time intervals.

3. The image capture device of claim 2, further comprising an autofocus unit configured for generating control signals to drive steps of the actuator and move the lens along the optical axis.

4. The image capture device of claim 2, further comprising a timing signal generator configured for executing at the predetermined time intervals and coordinating function of the image capture device.

5. The image capture device of claim 1, further comprising the processing unit configured for converting the digital image signals into luminance signals and chrominance signals.

6. The image capture device of claim 1, wherein the control unit comprises a feature-extraction unit, a calculation unit, an image assessment unit, and a composing unit, the feature-extraction unit being configured for locating the object's position, framing the square area within the target sector, and defining a central point of the square area, the calculation unit being configured for calculating the distance from the central point to the reference points and the actual movement distance required to relocate the image capture device to the reference points, the image assessment unit being configured for duplicating the square area and locating the duplicated central point at the different reference points, and the composing unit configured for framing the layout of the reference images.

7. The image capture device of claim 6, wherein the feature-extraction unit is further configured for separating the imaging plane into a grid by gridlines.

8. The image capture device of claim 7, wherein the reference points are located at intersecting points of the gridlines.

9. The image capture device of claim 7, wherein the reference points are located at intersecting points of the gridlines.

10. The image capture device of claim 1, wherein the signal processing unit comprises a correlated double sampler and an analog-to-digital converter, the correlated double sampler being configured for receiving the analog image signals and removing noise signals therefrom, and the analog-to-digital converter configured for converting the processed analog image signals into digital image signals.

11. A control method of an image capture device, comprising:

capturing image information of a object;

identifying a target sector of the image of the object framed in a square area;

marking reference points of the image information by vertical and horizontal lines;

calculating a distance from a central point of the square area to each of the reference points and an actual movement distance required to relocate the image capture device to the reference points according to relationships between the calculated distance, an image distance, and a object distance;

duplicating the square area in which the central point is located at each of the reference points; and displaying a layout of the reference images and corresponding information of the actual movement distance.

12. The control method of claim 11, wherein the image information is formed on an imaging plane separated into a grid by gridlines.

13. The control method of claim 12, wherein the intersection points of the gridlines are the reference points.

14. An image capture device capable of providing multiple previews of an object, comprising:

an image capture unit configured for capturing image information of the object and forming the image on an imaging plane;

a control unit configured for locating a target sector of the image of the object, framing a square area within the sector, defining a central point of the square area, forming reference points, calculating a distance from the central point to each of the reference points, duplicating the square area to locate the central point at each of the reference points, and calculating an actual movement distance required to relocate the image capture device to the reference points according to relationship of the distance; and a display configured for displaying a layout of the reference images and the corresponding information.

15. The image capture device of claim 14, wherein the image capture unit comprises a lens, an image sensor, and an actuator, the actuator being configured for driving the lens along the optical axis of the image capture unit according to control signals, and the image sensor being configured for transmitting the analog image signals to the signal processing unit according to predetermined time intervals.

16. The image capture device of claim 15, further comprising an autofocus unit configured for generating control signals to drive steps of the actuator and move the lens along the optical axis.

17. The image capture device of claim 14, further comprising a timing signal generator configured for executing at the predetermined time intervals and coordinating function of the image capture device.

18. The image capture device of claim 14, further comprising a storage unit configured for storing the reference images and the information of the actual movement distance.

19. The image capture device of claim 14, wherein the control unit comprises a feature-extraction unit, a calculation unit, an image assessment unit, and a composing unit, the feature-extraction unit being configured for locating the object's position, framing the square area within the target sector, and defining a central point of the square area, the calculation unit being configured for calculating the distance from the central point to the reference points and the actual movement distance required to relocate the image capture device to the reference points, the image assessment unit being configured for duplicating the square area and locating the duplicated central point at the different reference points, and the composing unit being configured for framing the layout of the reference images.

20. The image capture device of claim 19, wherein the feature-extraction unit is further configured for separating the imaging plane into a grid by gridlines.

* * * * *